(12) United States Patent
Ottman

(10) Patent No.: US 8,330,296 B2
(45) Date of Patent: Dec. 11, 2012

(54) HYBRID RENEWABLE ENERGY TURBINE USING WIND AND SOLAR POWER

(75) Inventor: Dawn Emily Ottman, Shadehill, SD (US)

(73) Assignee: Candew Scientific, LLC, Shadehill, SD (US)

( * ) Notice: Subject to any disclaimer, the term of this patent is extended or adjusted under 35 U.S.C. 154(b) by 473 days.

(21) Appl. No.: 12/424,386

(22) Filed: Apr. 15, 2009

(65) Prior Publication Data

US 2010/0207453 A1   Aug. 19, 2010

Related U.S. Application Data

(60) Provisional application No. 61/044,944, filed on Apr. 15, 2008.

(51) Int. Cl.
*H02J 3/00* (2006.01)
(52) U.S. Cl. ......................................................... 307/72
(58) Field of Classification Search ...................... 307/72
See application file for complete search history.

(56) References Cited

U.S. PATENT DOCUMENTS

| | | |
|---|---|---|
| 4,551,631 A | 11/1985 | Trigilio |
| 5,254,876 A | 10/1993 | Hickey |
| 6,016,015 A | 1/2000 | Willard, Jr. |
| 6,097,104 A | 8/2000 | Russell |
| 6,372,978 B1 | 4/2002 | Cifaldi |
| 7,045,702 B2 | 5/2006 | Kashyap |
| 7,345,374 B1 | 3/2008 | Jones et al. |
| 7,761,190 B2 * | 7/2010 | Delmerico et al. ........... 700/297 |
| 2008/0047270 A1 | 2/2008 | Gilbert |

OTHER PUBLICATIONS

Green, Hank. "Solar Sky Scraper: Over 7000 Panels", http://www.ecogeek.org/solar-power/563, Apr. 20, 2007 (visited Jan. 20, 2012).*

* cited by examiner

*Primary Examiner* — Hal Kaplan
(74) *Attorney, Agent, or Firm* — McKee, Voorhees & Sease, P.L.C.

(57) ABSTRACT

An environmentally friendly combination of wind turbine and solar energy collectors are provided. Solar photovoltaic material is secured to the surface of the wind turbine tower to augment the power generation capability of a wind turbine. The wind turbine energy output is controlled by a power management program and may be combined with the solar power energy that is generated from solar photovoltaic material covering the surface area of the body of the wind turbine's tower through an electrical subsystem associated with the wind turbine, an electrical subsystem associated with the solar energy collection system, and a combination subsystem conductively coupled both the electrical subsystem associated with the wind turbine and the electrical subsystem associated with the solar energy collection system.

15 Claims, 3 Drawing Sheets

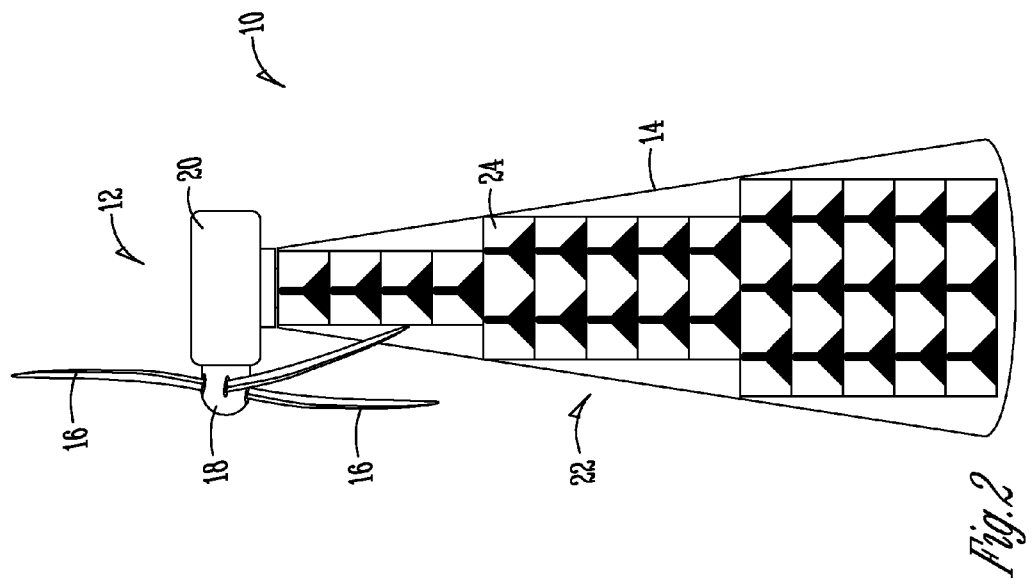
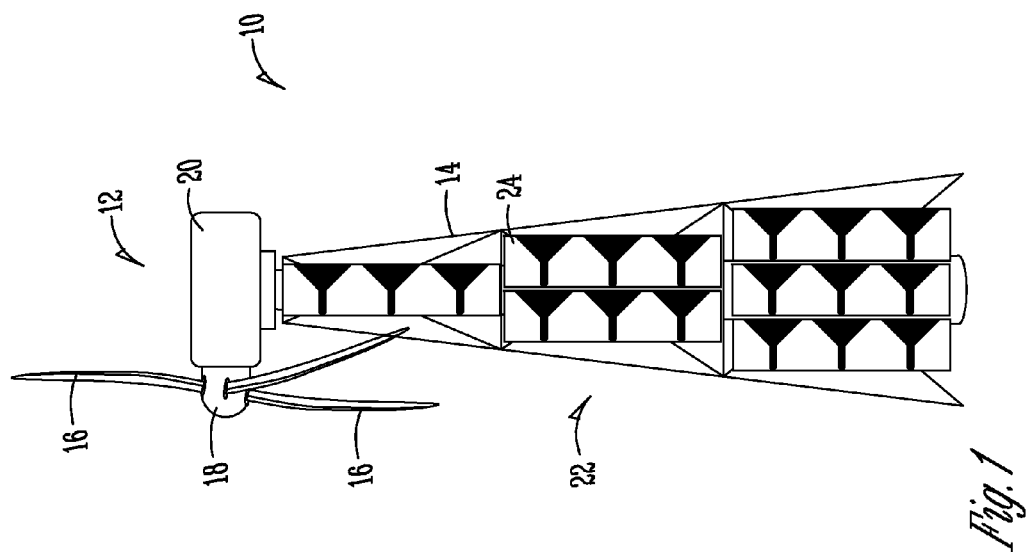

HYBRID RENEWABLE ENERGY TURBINE USING WIND AND SOLAR POWER

CROSS REFERENCE TO RELATED APPLICATIONS

This application claims priority under 35 U.S.C. §119(e) to provisional application Ser. No. 60/044,944 filed Apr. 15, 2008, herein incorporated by reference in its entirety.

BACKGROUND OF THE INVENTION

1. Field of the Invention

The present invention relates in general to the systems and methods for creating electrical energy from wind and solar sources and the storage of the same.

2. Description of Related Art

The use of wind turbines to generate electricity is well known in the prior art. These turbines generally include a vertical tower which supports a turbine operatively connected to a propeller which spins on a horizontal axis or to another device designed to take advantage of the moving wind. Many alternative designs and orientations have been shown and discussed in the prior art.

Generating electricity from renewable energy sources has received a great deal of attention in the past few years. Yet both wind and solar power generation have significant disadvantages. For example, wind speed and direction vary, making the amount of electricity generated by a wind turbine inconsistent and clouds obscure the sun making the amount of power generated by solar panels also inconsistent. To address these inconsistencies, it is desirable to exploit both solar and wind energy together for power generation for economic, practical, and environmental reasons.

In the current state of the art, efficiency of wind turbines greatly exceeds that of photovoltaic (PV) materials while having a much smaller land or sea footprint. Still, the opportunity exists for solar energy to be collected by PV materials for the conversion of solar energy directly into electrical power to improve the overall efficiency of the system. Additionally, an increase in dependency of the overall system is achieved, as upon conversion of solar energy, ancillary power functions needed to support and supplement the operation of the wind turbine are possible. A hybrid wind turbine combined with solar photovoltaic system can increase the maximum energy capture.

Known prior art wind turbines with a solar component include systems such as that shown and described in U.S. Pat. No. 6,372,978 entitled Wind/Sun Solar Collection System, which is incorporated by reference. This system uses separate solar panels and wind turbines requiring a vast footprint. However, many wind turbine "farms" are installed on land which is also put to other uses. For example, many wind turbine farms are located in agricultural areas where farming of the surrounding land is also desired. It is therefore desirable to provide a solar and wind collection system which minimizes its overall footprint and thus the amount of land required for its use.

Similarly, U.S. Pat. No. 6,097,104 entitled Hybrid Energy Recovery System describes a system that collects energy through separate solar and wind generators. Again, the solar panels and separate wind turbine take up a large area. Moreover, only enough solar energy to support the energy needs of the wind turbine is used and is used for emergency backup power. This design does not support a solar energy collection capability that is added to the wind turbine power for purposes of a hybrid power generation capability as with the present invention.

Attempts have been made to provide power generation from two renewable energy sources, but they have major structural difference as with the system design disclosed in U.S. Pat. No. 4,551,631 entitled Wind and Solar Electric Generating Plant where the system includes a separate wind generator or turbine which has a roof or other similar structure covering that supports an array of solar cells. The system uses a wind turbine which rotates about a vertical shaft. Such arrangements require a much larger footprint and thus tend to take up too much space for large scale use. Although the platform of solar cells may provide an additional source of energy when the sun is shining, the platform also serves to divert the natural wind flow thereby altering the effectiveness of the wind turbine. In addition, such a system results in additional cost for the construction of the roof platform, as well as added maintenance for the additional structure. Furthermore, many areas of the country, which receive substantial snowfall, are not well suited for utilizing these systems.

Other attempts have been made to include solar panels on the fan blades of a wind turbine as in U.S. Pat. No. 5,254,876 entitled Combined Solar and Wind Powered Generator with Spiral Blades and U.S. Pat. No. 7,045,702 entitled Solar-Paneled Windmill. Similarly, in U.S. Publication No. 2008/0047270 A1 entitled Solar Windmill: the solar panels are mounted on the surface of the flaps and fins. The inclusion of the solar panel or cells on the fan blades, fins or flaps limits the solar energy collection area and the thereby the effectiveness of combining the two renewable energy sources for a power generation capability. In these designs the solar power does not augment the efficiency of the wind turbine's power generation capability as does the hybrid wind and solar energy collection systems of the present invention.

In U.S. Pat. No. 7,345,374 entitled Decorative Windmill With Solar Panel, the solar energy collector is sized and selected to provide for the functional requirements of electrical devices associated with the windmill use or for the decoration of the windmill only. The solar generation capability is not used to be part of a hybrid energy generation system as with the present invention.

In these respects, the hybrid wind and solar turbine according to the present invention substantially departs from the conventional concepts and designs of the prior art, and in so doing provide an apparatus primarily developed for the purpose of generating power.

BRIEF SUMMARY OF THE INVENTION

There is a need for a more efficient wind power generation system. In view of the disadvantages in the known types of turbines now present in the prior art, the present invention provides a new hybrid wind and solar turbine construction wherein the same can be utilized for generating electrical power. Through the addition of solar PV to a wind turbine that is the hybrid renewable energy wind and solar turbine of the present invention there is a decrease in wind power production intermittency with an increase in the power generation capability.

The purpose of the present invention is to provide a new hybrid wind turbine and solar PV apparatus and method which has many of the advantages of the turbines and includes new features resulting from a new hybrid wind and solar turbine which is not anticipated, rendered obvious, suggested, or even implied by any of the prior art turbines, either alone or in any combination thereof. In general, the main purpose of the present invention, which will be described subsequently in greater detail, is to provide a more efficient and dependable power generation system utilizing wind and solar power generation and having features allowing the opportunity to harvest two renewable energy types into a hybrid power generation capability. This makes a wind turbine more fault-tolerant and increases its dependability as a power source.

The present invention is unique compared to other designs as it utilizes the wind turbine tower surface area to increase the wind turbine's power generation capability. To attain this, the present invention generally comprises a hollow tower with an outer shell constructed to support solar cells as well as provider a support tower for the wind turbine.

By using the surface area of the cone-like structure of most wind power generation turbines, we have a large surface for the placement of solar PV. By integrating PV materials into the wind turbine support structure, we achieve an increase in the wind generator's power generation capability and an enhancement of the wind generator's dependability.

Although some of the prior art provide a source of wind and solar power generators in one location, none of each of the prior art references a system including solar photovoltaic material on the turbine tower body. By placing the solar photovoltaic material on the tower or body of the wind turbine, there is no increase in the footprint, whether the wind turbine is located on land or on water, with the present invention.

On the wind turbine tower with the placement of the solar PV material in a partially vertical axis, there is a reduced risk of being covered in snow or debris due to this vertical placement and thereby reduces the maintenance. In addition, the vertical placement along the body of the tower ensures that the natural wind flow is not diverted and therefore has little or no interference with wind dynamics or the effectiveness of the wind turbine.

The present invention intends to solve the problem of what to do when the wind does not blow and the potential for power outage is greatest. It provides a workable solution for a large portion of that time and has the advantage of augmenting the power production capability when the wind does blow. As solar energy use becomes more popular as an environmentally non-invasive form of power generation, users of this technology save money while gaining a power source that is dependable.

The Return on Investment (ROI) of wind turbine power generation capabilities can be reduced as the power generation potential is increased by the present invention. This increase in efficiency makes hybrid wind turbines more cost effective than any prior art. For example, on a wind farm, this hybrid wind and solar power generation capability exceeds the power generation capability of the wind turbines while keeping the landscape or seascape footprint the same. This hybrid systems employing solar and wind power preferably will incur no or little energy costs and once installed, will be comparatively easy and inexpensive to maintain.

The present invention relates to a solar photovoltaic power generation capability to augment a wind power generation capability. The problem the invention solves is that of when the wind does not blow, a wind turbine produces no power. The solution of the present invention is to use another renewable energy capability for power generation in the absence of wind and the present invention uses solar energy. The use of solar energy as a source of energy is well known within the art. The present invention was conceived to solve the problem so that when the sun is shining, even if the wind is not blowing, power can be produced.

The present invention can be used on any wind power generation capability supported by a self-supported tower. The invention is made by adding Solar PV to the outside of the wind turbine tower, electrically wiring it to the inside where power collection takes place as the wind turbine generated power is combined for a total power output generation capability. This capability is based on two main criteria: the efficiency by which the photovoltaic material converts sun energy to electrical energy and the size of the solar array.

The dependability of wind power generation is enhanced by partially addressing the concern of the loss of a power generation capability when the wind does not blow. When the wind is not blowing, solar energy is collected during the daytime via photovoltaic material or solar panels electrically connected to the output of the wind turbine. This invention makes wind power generation a more dependable energy source for renewable power generation.

The present invention is used to produce power during the daylight hours and when the wind blows. The solar PV will produce electrical power during daylight hours. If the wind is blowing, the wind turbine will produce electrical power and the power produced by the Solar PV will add to the power production capability of the wind turbine. If the wind is not blowing, the Solar PV will ensure that the wind turbine continues to have a power production capability, thereby reducing outages.

In an embodiment of the present invention, the use of power plastic solar photovoltaic material can be placed on the portion of the tower, which receives direct sunlight. This embodiment is presented for ease of construction as the solar PV material is lighter in weight and less rigid and is less costly. This embodiment will reduce the upfront cost of the hybrid capability while having the flexibility of this solar PV material.

The placement of the solar PV in one embodiment of the present invention includes the use of thin film solar photovoltaic material and this reduces the cost of the PV material and the upfront costs of the hybrid capability. Thin film solar photovoltaic having a good solar efficiency in shaded areas can be placed on the portion of the wind turbine tower where there is relatively little direct sunlight. By adding thin film solar PV to the shaded portion of the wind turbine tower, an increase in the solar energy production capability will be realized.

The present invention has a wide range of uses from large commercial wind generation capabilities to the small wind power generator. In addition, the present invention could be used for wind turbine towers located on land or on water. The water-based Solar All in One Hybrid Energy Turbine would be able to produce more power than the land-based Solar All in One Hybrid Energy Turbine due to the light reflective qualities of the water, which would increase the solar PV power production capability.

Further objects and advantages of this invention will become apparent from a consideration of the drawings and ensuing description.

BRIEF DESCRIPTION OF THE DRAWINGS

Features and aspects of the present invention will be better understood will become apparent when consideration is given to the detailed description that follows with reference to the drawing, wherein:

FIG. 1 is a first embodiment of a wind turbine's lattice tower with the addition of solar photovoltaic according to the present invention.

FIG. 2 is another embodiment of a wind turbine with a cone shaped tower according to the present invention.

DETAILED DESCRIPTION OF THE PREFERRED EMBODIMENT

Figure 3:
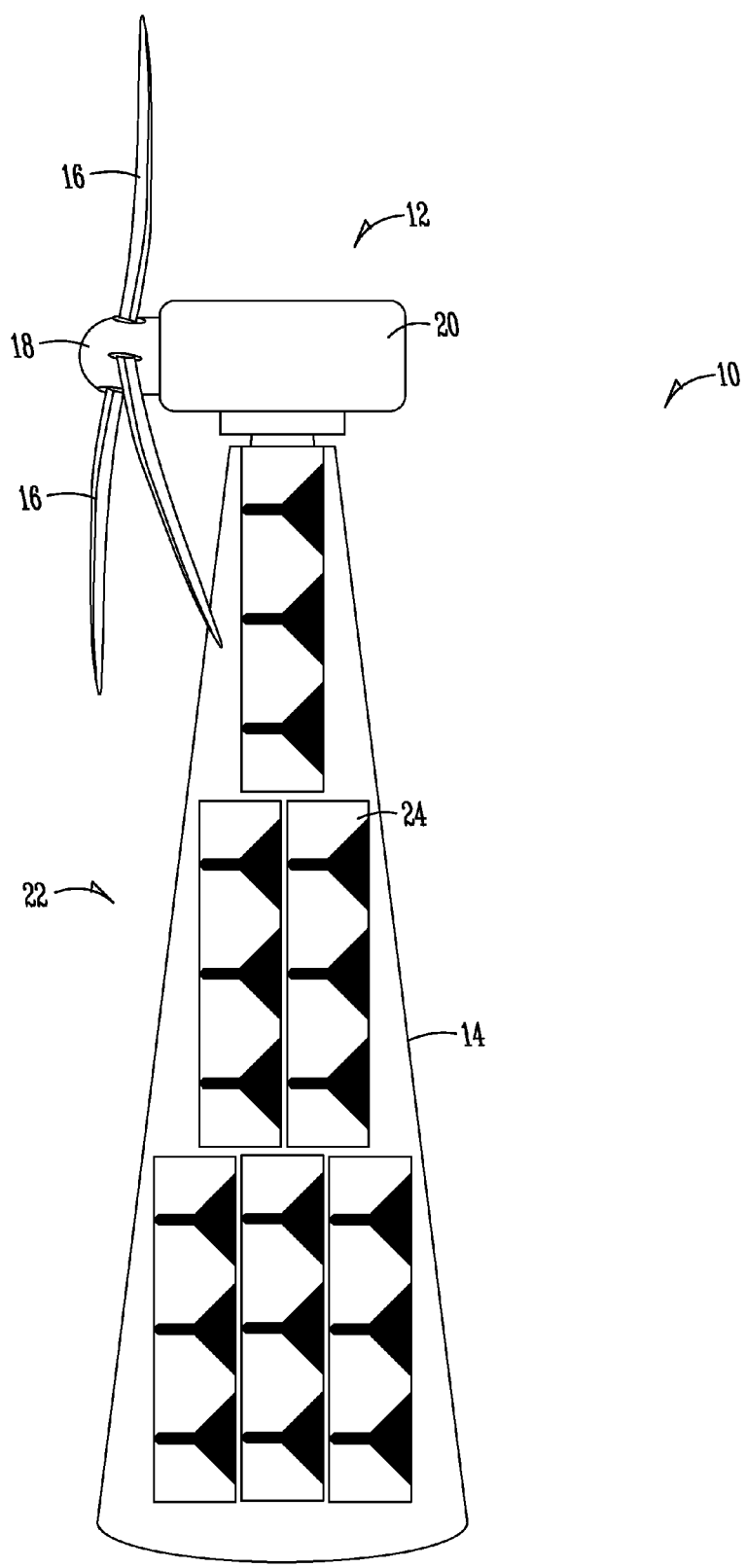
FIG. 3 is another embodiment of the wind turbine with a cone shaped tower according to the present invention.

In general, statements made in the specification do not necessarily delimit any of the various claimed inventions. Moreover, some statements may apply to some inventive features, but not to others.

The energy system according to the present invention includes a solar energy subsystem and a wind energy subsystem and a hybrid energy subsystem. The operation of the present invention can be monitored with user-controlled software, referred to herein as a power management program. In operation, the power management program controls and coordinates the solar energy subsystem, the wind energy subsystem and the hybrid energy subsystem. The major structural parts of the Solar All in One Hybrid Energy Turbine 10 are: the wind turbine assembly 12; the wind turbine tower 14; the solar photovoltaic assembly 22; the wind electrical subsystem; the solar electrical subsystem; the hybrid energy subsystem; and the power storage system (an embodiment).

The solar photovoltaic and the wind turbine generated power are fed to the hybrid power combination subsystem located inside of the wind turbine tower 14 where the outputs are combined into a single output power.

The wind energy subsystem 12 preferably comprises a wind energy collection system, a control system, and a wind energy conversion system. In addition, the wind energy subsystem may include a synchronous power generating capability (as in grid tied systems) or non-synchronous power generating capability (as in stand-alone systems.

The wind energy collection system 12 preferably comprises a tower 14, and a wind turbine assembly 16, 18, 20. The tower 14 is preferably a solid structure or a lattice frame structure made up of legs and cross members. The wind assembly 16, 18, 20 is preferably attached to the top of the tower 14 with a rotational blade assembly 16 attached to a swivel bracket with a wind vane rigidly attached to the other end of the swivel bracket to keep the rotational blade assembly 16 always properly facing into the wind. The rotational blade assembly 16 is secured to a generally horizontal axle 18 which is operatively connected to a generator 20. A transmission may be included if desired between the axle 18 and the generator 20. The tower 14 is preferably constructed of metal, but may be constructed of plastic, wood or any other suitable material as desired.

The hybrid energy subsystem preferably comprising of a power combination system, a control system, and a power output system is preferred. This combination process includes power converters and inverters and charge controllers considered standard with wind turbine power production and solar PV power production capabilities. The difference will be the combining network to add these two power generation capabilities outputs together to one hybrid, yet integrated power source.

The solar energy subsystem preferably comprises a solar energy collection system 22, a control system, and a solar energy conversion system. The solar energy collection system 22 comprises the solar photovoltaic collectors or cells 24 and other necessary circuitry for receiving and collecting solar energy and converting the solar energy into electrical energy. The solar energy subsystem is preferably conductively coupled with electrical conductors to the control system that directs the generated energy and a rechargeable electrical power source.

In operation, the solar energy collection system 22 preferably converts solar energy into electrical energy. The purpose of the solar energy subsystem is preferably to convert solar energy into electrical energy and to deliver the generated electrical energy to the solar energy subsystem, or one or more electrical subsystems, or the rechargeable electrical power source.

The solar control system preferably comprises circuitry, microprocessors, memory devices, sensors, switches, and other electronic components necessary to partially or fully direct electrical energy from the solar energy collection system 22 to the hybrid control system or to the rechargeable electrical power source, or to other control systems where the electrical energy is needed.

The solar collectors 24 may be located on any suitable wind turbine tower surface, however it is preferred that the solar collectors 24 be optimally exposed to solar light. In alternative embodiments, a variety of solar photovoltaic materials may be used and arranged to optimize the solar energy collection capability.

An embodiment of solar energy subsystem includes a rechargeable electrical power source. This rechargeable electrical power source preferably comprises a rechargeable battery for storing electrical energy; however, rechargeable electrical power source may alternatively comprise of any rechargeable electrical power storage device, such as a capacitor, battery pack, battery bank, or any other suitable device for storing electrical energy, or combination thereof. The rechargeable electrical power source is preferably conductively coupled to the solar energy collection system 22 and control system with electrical conductors.

However, when the rechargeable electrical power source is fully charged, the solar energy collection system preferably delivers electrical energy to the solar energy subsystem where the electrical energy is preferably diverted for uses other than charging rechargeable electrical power sources. For example, the electrical energy could be directed to the hybrid combination energy subsystem or it may be used to directly power electrical subsystems rather than the electrical subsystems consuming power from the rechargeable electrical power source.

The power management program is integrated with the solar energy subsystem, the wind energy subsystem and the hybrid energy subsystem to control each system's output and monitor each system's input. For example, when an input of electrical energy is sensed from any system, the input is measured. The measured input is then compared to the desired output. If the measured input exceeds the desired output to an intended source, modifications to the system are made. For instance, should both the solar and wind generators operate at maximum capacity, the power output may likely exceed the allowable output to an electrical grid. In such situations, the power management program will instruct the wind assembly 12, which operates on top of the tower 14 to rotate about the tower 14's vertical axis. Such rotation is accomplished by a positioning motor as is well known in the art. In this manner the wind assembly 12 is no longer facing directly into the wind, but rather is being rotated by only a component of the wind's velocity. Such yawing of the wind assembly 12 will reduce the power output to meet the requirements of the power management program.

In addition, should the power management program sense there is no wind at the present time, the wind energy subsystem can be shut down to conserve power. Similarly, should the power management program detect an input from a photo sensor that it is no longer sunny, the power management program will shut down the solar energy subsystem. Finally, the power management program can also control the distribution of any power generated to ensure all subsystems of the hybrid wind turbine and solar photovoltaic system 10 operate within limits as desired.

Referring now to FIG. 1 in the drawings, the preferred embodiment of a hybrid wind turbine and solar photovoltaic system 10 according to the present invention is illustrated. Hybrid wind and solar power generation system preferably comprises of a tower or frame 14, a wind turbine 12, and a solar photovoltaic assembly 22.

The electrical power subsystems would be located within the hollow center of the body of the tower 14 and include the wind electrical power subsystem, a solar electrical power subsystem, and a power combination subsystem, switch, and output system.

The present invention is a vast improvement to the dependability of wind turbine power production as it substantially reduces power outages caused when the wind does not blow. The efficiency of the wind power generation capability is increased as well. The focus of the present invention is primarily on the use of the solar photovoltaic material 24 on the tower 14 of a the hybrid wind turbine and solar photovoltaic system 10 as shown in FIG. 1 and the combination of the output energies for a hybrid solution.

FIGS. 2 and 3 show two hybrid wind turbine and solar photovoltaic systems 10 with two potential orientations of the solar PV photovoltaic material 24. Although the orientation possibilities are many, only two are shown here and therefore this does not exclude other orientation possibilities.

The solar PV 24 in FIG. 1 can be flexible PV such as thin film or power plastic or can be integrated into the building material of the sold body tower 14 (shown in FIGS. 2 and 3) or to the structural elements or members of the lattice tower 14. The solar PV 24 can be structures added to the outside of the solid or lattice tower 14.

The solar PV 24 is electrically coupled to the solar electrical subsystem through small openings in the tower structure. The solar PV materials 24 are preferably placed to fully encircle the tower 14's surface area or placed to efficiently maximize solar energy capture. As described in the embodiments, various types of solar PV 24 may be combined.

In FIG. 1, all electrical coupling takes place inside the tower 14 such as the wind electrical subsystem and the solar PV electrical subsystem and the combination electrical subsystem.

Referring now to FIGS. 2 and 3, the preferred embodiment of the hybrid wind turbine and solar photovoltaic system 10 according to the present invention is illustrated. The hybrid wind turbine and solar photovoltaic system 10 shown in FIG. 1 preferably comprises a solid, but generally hollow tower 14 generally constructed of reinforced cement or other suitable material, a wind assembly 12, and a solar photovoltaic assembly 22.

The electrical power subsystems for the hybrid wind turbine and solar photovoltaic system 10 as shown in FIGS. 2 and 3 would preferably be housed to protect against weather and located in the center of the solid body of the tower and include the wind electrical power subsystem, a solar electrical power subsystem, and a power combination subsystem, switch, and output system.

Figure 4:
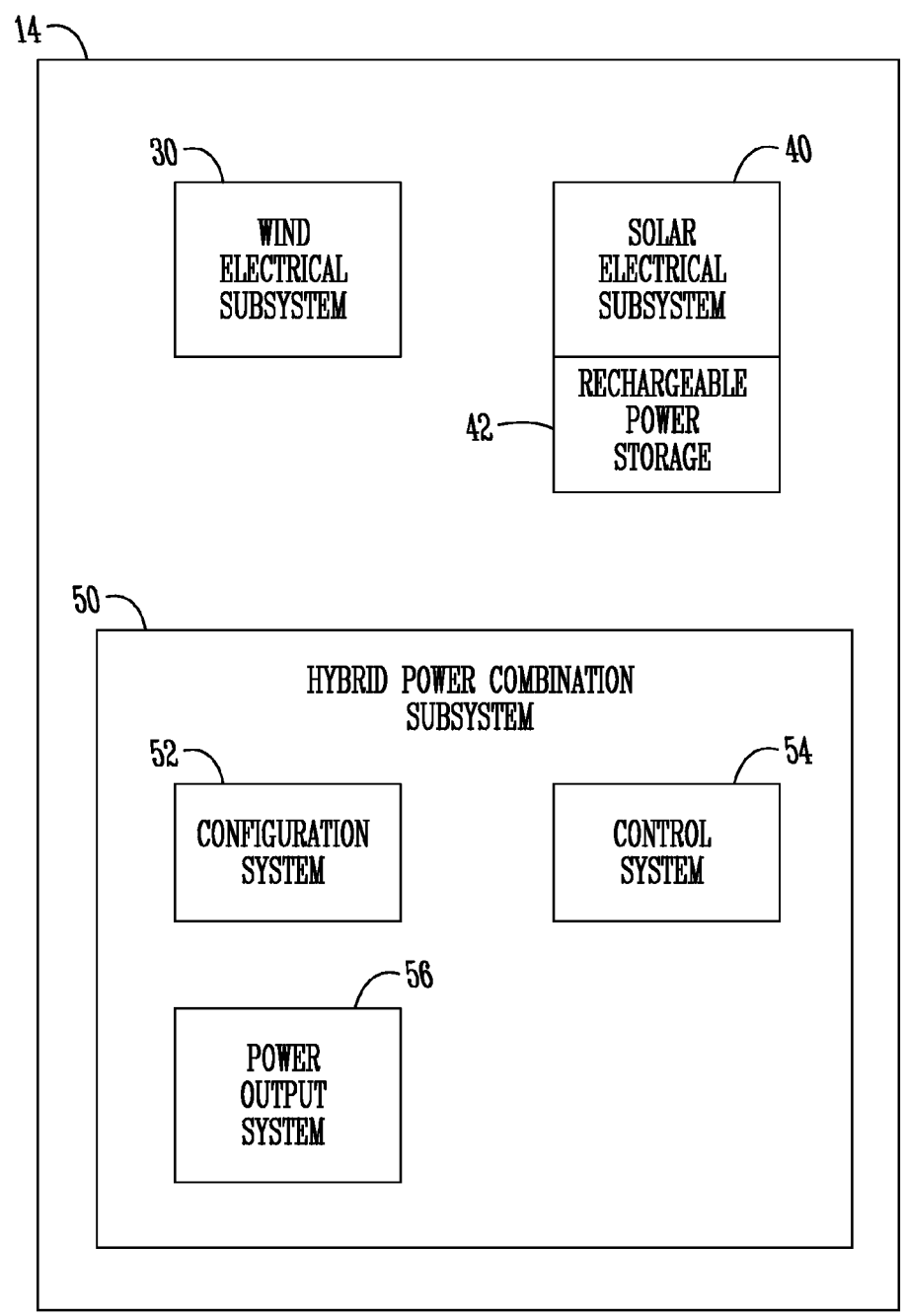
FIG. 4 provides a block diagram.

FIG. 4 provides a block diagram. FIG. 4 illustrates the subsystems of the hybrid turbine and solar photovoltaic system 10. As discussed above, the tower 14 includes a wind electrical subsystem 30, a solar electrical subsystem 40, and a hybrid combination subsystem 50. The solar electrical subsystem 40 may include a rechargeable power source 42. The hybrid combination. subsystem 50 includes a power combination system 52, a control system 54, and a power output system 56.

While this invention has been described with reference to an illustrative embodiment, this description is not intended to be construed in a limiting sense. Various modifications and other embodiments of the invention will be apparent to persons skilled in the art upon reference to the description.

What is claimed is:

1. A hybrid wind turbine and solar photovoltaic system, comprising:
 a tower including an outer surface;
 a wind turbine including a propeller comprising one or more blades rotating about a generally horizontal axle which is operatively connected to a generator;
 a wind electrical subsystem contained within the tower;
 a solar energy collection system including a plurality of solar cells secured to the outer surface of the tower;
 a solar electrical subsystem contained within the tower; and
 a combination subsystem conductively coupled to both the wind electrical subsystem and the solar electrical subsystem.

2. The hybrid wind turbine and solar photovoltaic system according to claim 1 wherein the wind turbine includes a synchronous power generating capability.

3. The hybrid wind turbine and solar photovoltaic system according to claim 1 wherein the wind turbine includes a non-synchronous power generating capability.

4. The hybrid wind turbine and solar photovoltaic system according to claim 1 wherein the tower includes an open frame.

5. The hybrid wind turbine and solar photovoltaic system according to claim 1 wherein the tower includes a solid surface and is generally hollow inside.

6. The hybrid wind turbine and solar photovoltaic system according to claim 1, wherein the solar electrical subsystem includes a rechargeable power source.

7. The hybrid wind turbine and solar photovoltaic system according to claim 1, wherein the generated energy is converted to a utility grid.

8. The hybrid wind turbine and solar photovoltaic system according to claim 1, wherein the combination subsystem includes a power combination system, a control system, and a power output system.

9. The hybrid wind turbine and solar photovoltaic system according to claim 1, wherein the solar energy system is selected from a group consisting of solar photovoltaic thin film, power plastic, power film, and crystalline silicon.

10. The hybrid wind turbine and solar photovoltaic system according to claim 1 further including a power management program.

11. The hybrid wind turbine and solar photovoltaic system according to claim 1, wherein the system is located offshore.

12. A system for generating electricity, the system comprising:
 a tower;
 a wind turbine on top of the tower, the wind turbine including a plurality of blades mounted on a generally horizontal axle which is operatively connected to a generator; and
 a plurality of solar panels mounted on the tower.

13. The system for generating electricity of claim 12 wherein the tower- is an open tower.

14. The system for generating electricity of claim 12 wherein the tower has a solid surface.

15. The system for generating electricity of claim 12 wherein the solar panels are flexible and conform to a surface area on the tower.

* * * * *

UNITED STATES PATENT AND TRADEMARK OFFICE
CERTIFICATE OF CORRECTION

PATENT NO. : 8,330,296 B2
APPLICATION NO. : 12/424386
DATED : December 11, 2012
INVENTOR(S) : Dawn Emily Ottman It is certified that error appears in the above-identified patent and that said Letters Patent is hereby corrected as shown below:

Col. 9, Claim 13, Line 2:
DELETE after the "tower-"
ADD after the --tower--

Signed and Sealed this
Twelfth Day of February, 2013

Teresa Stanek Rea
*Acting Director of the United States Patent and Trademark Office*